W. J. DWYER.
HEATER.
APPLICATION FILED JULY 5, 1911.

1,032,191.

Patented July 9, 1912.

Inventor
William J. Dwyer

Witnesses
A. B. Hanshaw
J. B. Hanapel

By M. M. Cady
Attorney

UNITED STATES PATENT OFFICE.

WILLIAM J. DWYER, OF BERNARD, IOWA.

HEATER.

1,032,191.　　　　　Specification of Letters Patent.　　　Patented July 9, 1912.

Application filed July 5, 1911. Serial No. 636,981.

*To all whom it may concern:*

Be it known that I, WILLIAM J. DWYER, a citizen of the United States, residing at Bernard, in the county of Dubuque and State of Iowa, have invented certain new and useful Improvements in Heaters, of which the following is a specification.

My invention relates to heating devices especially adapted for the various uses by barbers; and the leading object is to provide a heater, whereby water of various degrees of temperature and adapted for various purposes, may be furnished from the same tank or source of supply. Its essential features of construction and operation will be fully set out and explained in the following specification when considered in connection with the drawings accompanying the same and forming a part hereof.

Figure 1:
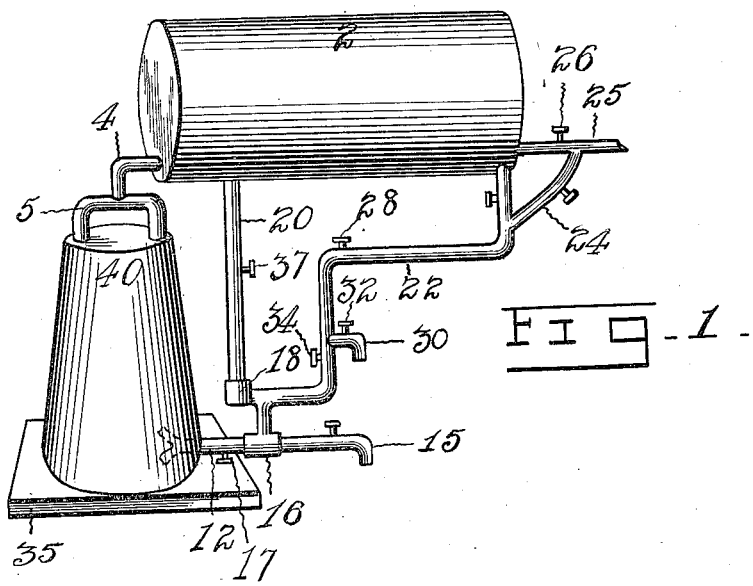
Figure 2:
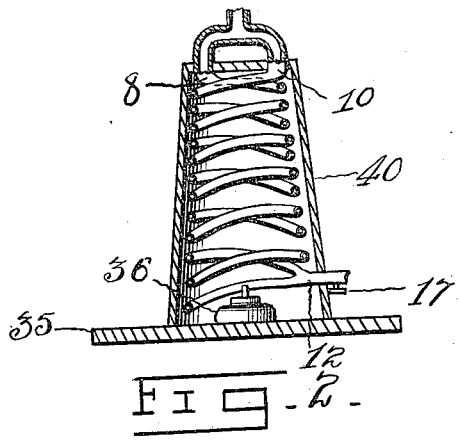

Figure 1 is a perspective view taken from one side. Fig. 2 is a vertical section of the heat supply.

Like characters of reference denote corresponding parts in each of the figures.

In the drawings, 2 designates the tank, which is preferably tubular in form. In one end, near the bottom, is inserted a pipe 4, which opens into a bent pipe 5 near its middle and each end 6 of the pipe 5 is secured to and empties into a coil 8 and 10. The coils are set one around the other and preferably tapering from the base toward the top. The lower end of each coil is attached to and opens into a cross pipe 12. At the middle of the pipe 12 is secured a pipe which pipe is connected to a faucet 15 by a coupling 16 and also by another coupling 18 to a circulation pipe 20 which connects with the tank 2 near its forward end near the pipe 4. To the coupler 18 is also secured a cold water pipe 22 which connects with the rear end of the tank 2 and also with the supply pipe 25 by a pipe 24. In the pipe 25 is a stop cock 26 and in the cold water pipe 22 is a stop cock 28, also a faucet 30 supplied with a stop cock 32. There is also another stop cock 34 in the cold water pipe and a stop cock 37 in the pipe 20. Beneath the coils is a platform 35 on which a lamp 36 is set from which the heat is supplied to the coils. The heat may be supplied from any convenient source. The coils and the heating means are inclosed in a case 40 preferably of asbestos or any other non-heat conducting material. The pipes 22 and 24 are provided respectively with cocks 22' and 24' whereby the temperature of the water from these pipes mixing in pipe 22 near the lower portion of the latter may be properly regulated.

The manner in which the device may be used to advantage is by opening all of the stop cocks and filling the tank, coils and all of the pipes from the water supply 25, then turn on the heat and shut the stop cock 34 and faucet 15. The water in the coils will, when heated, start to circulate up into the tank and down through the pipe 20 into the coils again. After the water is heated, then if the user desires hot water he will shut the cock 37 and draw off the hot water through the faucet 15. If warm water is desired then he closes the cock 17 and opens the cock 37 and draws the warm water off through the faucet 15. If cold water is wanted then the cock 34 is closed and the water is drawn through the faucet, 30. If the water, varying in different degrees in temperature and under pressure is required in shampooing then a hose is attached to the upper faucet 30, and cocks 22' and 24' in the hot and cold water pipes 22 and 24 respectively adjusted to suit the requirements. The whole device is set up at some height on the wall and the cocks 28 and 17 are closed and cocks 37 and 34 are opened and plenty of warm water, under some pressure, will be supplied, then to finish, the cock 34 is shut and 28 and 26 are opened and the cold water is supplied through the same faucet 30. If both hot and cold water be desired in case of bath then the cocks, 17, 26 and 28 are opened and 34 and 37 are closed and the faucets 15 and 30 are opened and the hot water through the faucet 15 will be furnished and cold water through the faucet 30.

It will be observed that by this mode of construction and the manipulation of the various cocks that water of almost any degree of temperature may be furnished from the same source at the same time.

Having now described my invention what I claim and desire to secure by Letters Patent is:—

1. In a device of the character described, a tank, a cold water inlet pipe therefor, a heater having pipe connection with the tank, a circulating pipe 20 connecting the heater with the tank, a pipe 22 connecting the heater with the tank, said pipes 20 and 22 being connected adjacent their point of connection with the heater, a pipe 24 connecting the cold water inlet pipe with the pipe 22, a faucet in pipe 22, and valves in said pipes.

2. In a device of the character described, a heater, a faucet at the lower end thereof, a tank having pipe connection at one of its ends with the upper end of the heater, a cold water supply pipe leading into the other end of the tank, a circulating pipe 20 connecting the tank with the said faucet, a pipe 22 connecting the tank with the said faucet, a pipe connecting the cold water supply pipe with the pipe 22 at a point between the tank and faucet, a faucet in the pipe 22, and valves in said pipes.

In witness whereof, I affix my signature in the presence of two witnesses.

WILLIAM J. DWYER.

Witnesses:
M. M. CADY,
A. B. HANSHAW.

Copies of this patent may be obtained for five cents each, by addressing the "Commissioner of Patents Washington, D. C."